US008631986B2

(12) United States Patent
Hlinka et al.

(10) Patent No.: US 8,631,986 B2

(45) Date of Patent: Jan. 21, 2014

(54) FASTENER DRIVER WITH AN OPERATING SWITCH

(75) Inventors: Eric E. Hlinka, Roselle, IL (US); Joseph S. Scaduto, Schaumburg, IL (US); John DeCicco, Elmhurst, IL (US); Chia Sheng Lang, Taipei (TW)

(73) Assignee: Robert Bosch GmbH, Stuttgart (DE)

(*) Notice: Subject to any disclaimer, the term of this patent is extended or adjusted under 35 U.S.C. 154(b) by 578 days.

(21) Appl. No.: 12/631,142

(22) Filed: Dec. 4, 2009

(65) Prior Publication Data

US 2011/0132959 A1 Jun. 9, 2011

(51) Int. Cl.

| | |
|---|---|
| ***B21J 15/28*** | (2006.01) |
| ***B27F 7/17*** | (2006.01) |
| ***B23Q 5/00*** | (2006.01) |

(52) U.S. Cl.

USPC .................................................. 227/4; 173/11

(58) Field of Classification Search

USPC ......................... 227/1-8; 173/2, 18, 141, 217

See application file for complete search history.

(56) References Cited

U.S. PATENT DOCUMENTS

| | | | | |
|---|---|---|---|---|
| 4,042,036 | A * | 8/1977 | Smith et al. | 173/13 |
| 4,129,240 | A * | 12/1978 | Geist | 227/8 |
| 4,189,080 | A * | 2/1980 | Smith et al. | 227/8 |
| 4,298,072 | A * | 11/1981 | Baker et al. | 173/13 |
| 4,558,747 | A | 12/1985 | Cunningham | |
| 4,721,170 | A | 1/1988 | Rees | |
| 4,747,455 | A | 5/1988 | Cunningham | |
| 4,769,936 | A | 9/1988 | Miller | |
| 4,964,558 | A | 10/1990 | Crutcher et al. | |
| 5,067,266 | A | 11/1991 | Findlay | |
| 5,083,694 | A * | 1/1992 | Lemos | 227/8 |
| 5,577,600 | A | 11/1996 | Schoene et al. | |
| 6,012,622 | A * | 1/2000 | Weinger et al. | 227/8 |
| 6,176,412 | B1 * | 1/2001 | Weinger et al. | 227/142 |
| 6,431,429 | B1 * | 8/2002 | Canlas et al. | 227/130 |
| 6,966,476 | B2 | 11/2005 | Jalbert et al. | |
| 7,137,541 | B2 | 11/2006 | Baskar et al. | |
| 7,213,732 | B2 * | 5/2007 | Schell et al. | 227/8 |
| 7,322,427 | B2 * | 1/2008 | Shimma et al. | 173/48 |
| 7,322,506 | B2 * | 1/2008 | Forster | 227/133 |
| 7,331,403 | B2 * | 2/2008 | Berry et al. | 173/1 |
| 7,646,157 | B2 * | 1/2010 | Cruise et al. | 318/161 |
| 7,677,425 | B2 * | 3/2010 | Brendel et al. | 227/8 |
| 8,136,606 | B2 * | 3/2012 | Krondorfer et al. | 173/1 |
| 8,336,748 | B2 * | 12/2012 | Hlinka et al. | 227/8 |
| 2005/0040206 | A1 * | 2/2005 | Adams et al. | 227/131 |
| 2005/0218176 | A1 * | 10/2005 | Schell et al. | 227/8 |
| 2008/0173139 | A1 * | 7/2008 | Miyazaki et al. | 81/57.11 |
| 2008/0257577 | A1 * | 10/2008 | Tanaka et al. | 173/4 |
| 2008/0308592 | A1 * | 12/2008 | Schell et al. | 227/8 |
| 2010/0038397 | A1 * | 2/2010 | Krondorfer et al. | 227/8 |

(Continued)

OTHER PUBLICATIONS

Dictionary reference PDF for definition of solenoid.*

*Primary Examiner* — Robert Long

(74) *Attorney, Agent, or Firm* — Maginot, Moore & Beck

(57) ABSTRACT

A fastening tool includes a drive assembly configured to drive a fastener from the fastening tool, a work contact element moveable between an extended position and a depressed position, a trigger moveable between a release position and a fire position, an electric power source, an electronic control unit configured to deliver electric power from the electric power source to the drive assembly, and a single electric switch connected to the electronic control unit and configured to indicate that the work contact element is in the depressed position and the trigger is in the fire position.

12 Claims, 12 Drawing Sheets

(56) References Cited

U.S. PATENT DOCUMENTS

| | | | | |
|---|---|---|---|---|
| 2010/0102102 | A1* | 4/2010 | Matsunaga et al. | 227/8 |
| 2010/0116863 | A1* | 5/2010 | Suda | 227/8 |
| 2010/0155449 | A1* | 6/2010 | Shor | 227/8 |
| 2010/0206933 | A1* | 8/2010 | Wu et al. | 227/8 |
| 2010/0236800 | A1* | 9/2010 | Watanabe et al. | 173/20 |
| 2010/0236801 | A1* | 9/2010 | Furusawa et al. | 173/47 |
| 2010/0237124 | A1* | 9/2010 | Shima et al. | 227/8 |
| 2011/0062207 | A1* | 3/2011 | Hlinka et al. | 227/8 |
| 2011/0073630 | A1* | 3/2011 | Kakuda et al. | 227/8 |

* cited by examiner

FASTENER DRIVER WITH AN OPERATING SWITCH

This disclosure relates to the field of power tools and particularly to devices used to drive fasteners into work-pieces.

BACKGROUND

Fasteners such as nails and staples are commonly used in projects ranging from crafts to building construction. While manually driving such fasteners into a work piece is effective, a user may quickly become fatigued when involved in projects requiring a large number of fasteners and/or large fasteners to be driven into a work piece. Moreover, proper driving of larger fasteners into a work piece frequently requires more than a single impact from a manual tool.

In response to the shortcomings of manual driving tools, power-assisted devices for driving fasteners into work pieces have been developed. Contractors and homeowners commonly use such devices for driving fasteners ranging from brad nails used in small projects to common nails which are used in framing and other construction projects. Compressed air has been traditionally used to provide power for the power-assisted (pneumatic) devices. However, other power sources have also been used, such as electric motors.

Various safety features have been incorporated into pneumatic and other power nailers. One such device is commonly referred to as a work contact element (WCE). A WCE is incorporated into nail gun designs to prevent unintentional firing of the nail gun. A WCE is typically a spring loaded mechanism which extends forwardly of the portion of the nail gun from which a nail is driven. In operation, the WCE is pressed against a work piece into which a nail is to be driven. As the WCE is pressed against the work piece, the WCE compresses the spring and generates an axial movement which is transmitted to a trigger assembly. The axial movement is used to reconfigure a safety device, also referred to as a trigger disabling mechanism, so as to enable initiation of a firing sequence with the trigger of the nail gun.

In past nailers incorporating a WCE, the safety mechanism has required two switches or sensors in order to operate. The first switch is coupled to the WCE and is closed only when the WCE is pressed against a work piece. In some existing nailers, the nailer's electric drive motor begins rotating in response to the first switch being closed. A second switch is coupled to a trigger that the user pulls in order to fire the nailer. A control mechanism, usually an electronic circuit, activates the nailer only in response to both switches being closed simultaneously. In certain embodiments, the control mechanism is also capable of determining the order in which the two switches were closed. If the WCE switch is closed, followed by the trigger switch, then the nailer will fire, but if the trigger switch is closed first, followed by the WCE switch, the nailer will not fire.

Existing nailers have several disadvantages. First, they require multiple switches adapted to use in different parts of the nailer. This increases the cost of materials, the cost of manufacturing, and potentially reduces the nailer's reliability. Second, nailers using an electronic control mechanism must provide a constant supply of electrical power to the electronic control device in order to determine when the different switches were closed in order to operate the nailer safely. Third, in nailers where depressing the WCE causes an electric drive motor to rotate, the motor may run for longer periods of time while the WCE is depressed but the user does not actually fire a nail, wasting electrical power. In existing hand-held nailers using portable power sources like batteries, the inefficiencies stated above result in the nailer having to be taken out of service for recharging more often.

What is needed is a fastener device with a safety mechanism incorporating a WCE that operates safely, but may be manufactured using fewer parts than traditional nailers. What is further needed is a fastener that uses less electrical energy by operating an electric drive motor and electronic control mechanism only for a minimum length of time needed to properly fire a fastener.

SUMMARY

A fastening tool includes a drive assembly configured to drive a fastener from the fastening tool, a work contact element moveable between an extended position and a depressed position, a trigger moveable between a release position and a fire position, an electric power source, an electronic control unit configured to deliver electric power from the electric power source to the drive assembly, and a single electric switch connected to the electronic control unit and configured to indicate that the work contact element is in the depressed position and the trigger is in the fire position.

A fastening tool for driving fasteners, the fastening tool includes a drive assembly configured to drive a fastener from the fastening tool, a work contact element moveable between an extended position and a depressed position, a trigger moveable between a release position and a fire position, an electric power source, an electronic control unit; configured to control when the drive assembly drives a fastener from the fastening tool, and an electric switch connected to the electronic control unit and configured to indicate that the work contact element is in the depressed position and the trigger is in the fire position.

A fastening tool for driving a plurality of fasteners, the fastening tool includes a battery configured to deliver electric power, a fastener drive assembly including an electric motor and a drive actuator configured to move between a first position and a second position, the fastener drive assembly configured to expel one of the plurality of fasteners from the fastening tool when the drive actuator is in the second position, a work contact element moveable between an extended position and a depressed position, a trigger moveable between a release position and a fire position, an electronic control unit configured to control delivery of electric power from the battery to the electric motor and to the drive actuator, and an electric switch. The electric switch is moveable between an open position and a closed position, the electric switch is configured to move to the closed position when the work contact element is in the depressed position and the trigger is in the fire position, and the electric switch is configured to move to the open position when the work contact element is in the extended position or the trigger is in the release position, and electric power is delivered to the electric motor and the drive actuator only when the electric switch is in the closed position.

DETAILED DESCRIPTION

For the purposes of promoting an understanding of the principles of the embodiments disclosed herein, reference will now be made to the drawings and descriptions in the following written specification. It is understood that no limitation to the scope of the subject matter is thereby intended. It is further understood that the present disclosure includes any alterations and modifications to the illustrated embodiments and includes further applications of the principles of the disclosed embodiments as would normally occur to one skilled in the art to which this disclosure pertains.

Figure 1:
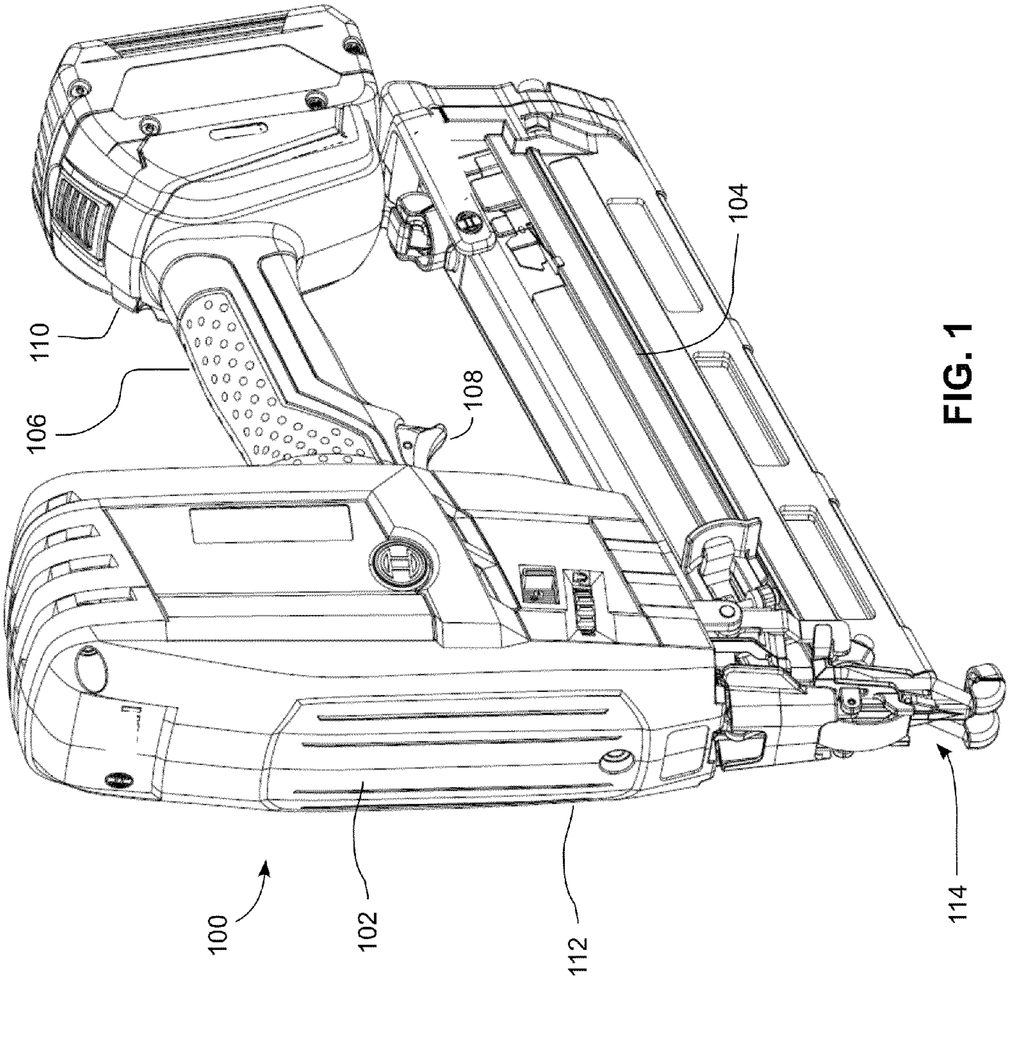
FIG. 1 depicts an external side perspective view of an exemplary embodiment of a fastener driver using a WCE and a single switch safety mechanism.

FIG. 1 depicts an external side perspective view of a device 100 used for driving a fastener including a drive housing 102 and a fastener storage and feeding device 104. The term "magazine" as used herein refers to any such fastener storage and feeding device. The fastener driver disclosed herein may be used with a wide variety of fasteners found in the construction art, including nails or staples of various sizes and types. The drive housing 102 defines a handle portion 106 from which a trigger 108 extends, a receptacle area 110 and a drive section 112. The fastener guide 104 in this embodiment is spring biased to force fasteners, such as nails or staples held in a cartridge or a clip, serially one after the other, into a loaded position adjacent the drive section 112. The receptacle area 110 may be used to connect a source of compressed air or other source of power (such as a battery) to the device 100.

Figure 2:
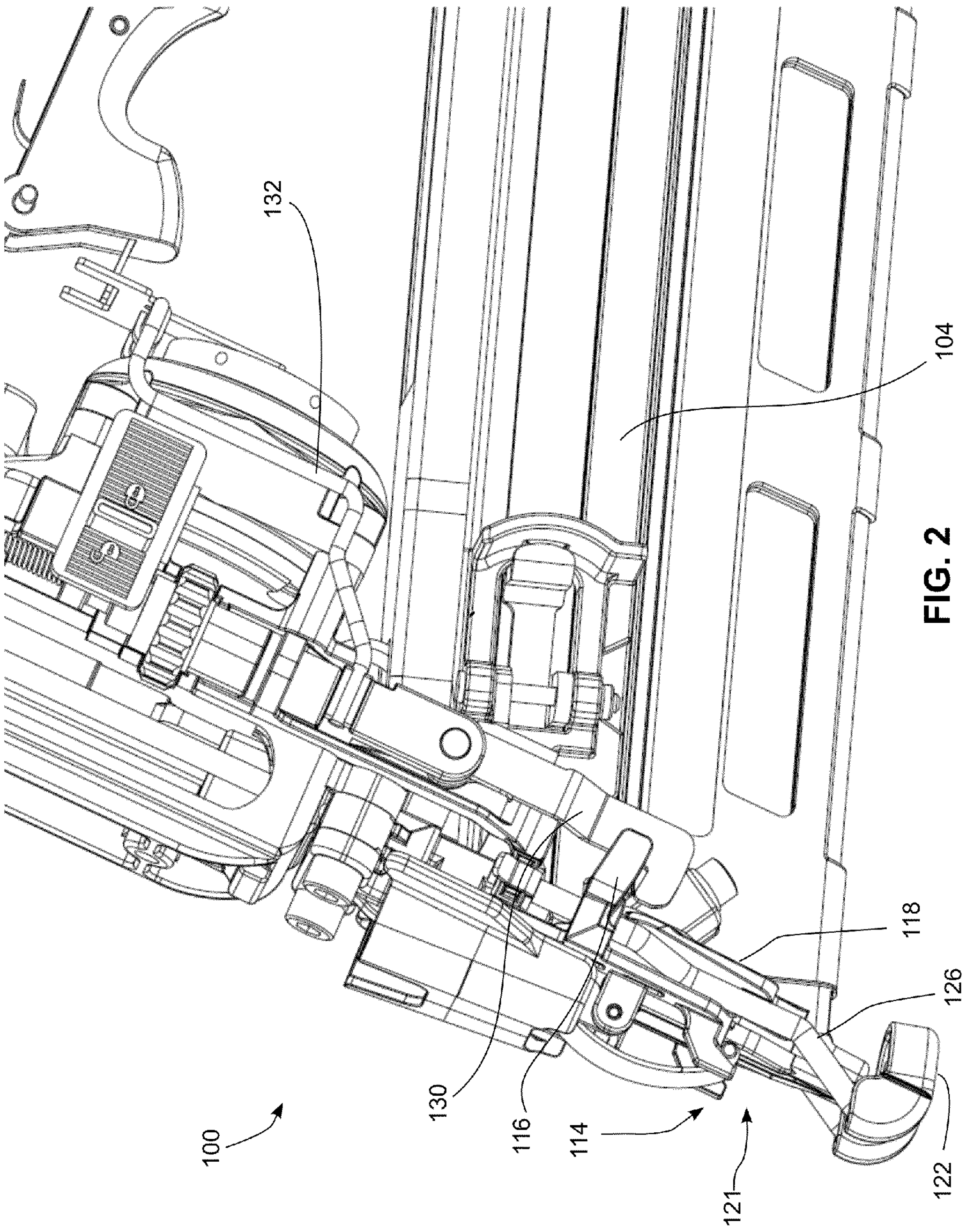
FIG. 2 depicts a cutaway side view of the nose assembly of the fastener driver of FIG. 1 with a work contact element in an extended position.

Located adjacent to the drive portion 112 and the magazine 104 is a nose assembly 114. FIG. 2 shows a cutaway view of the nose assembly 114, the lower part of the drive portion 112, and an end portion of the magazine 104. The nose assembly 114 includes a work contact element (WCE) 120 configured to slide along a nose frame 118 which extends outward from the housing 102. The WCE 120 is configured to slide relative to the housing 102 and nose frame 118 between an extended position, as shown in FIG. 2, and a retracted/depressed position, as shown in FIG. 3.

Figure 3:
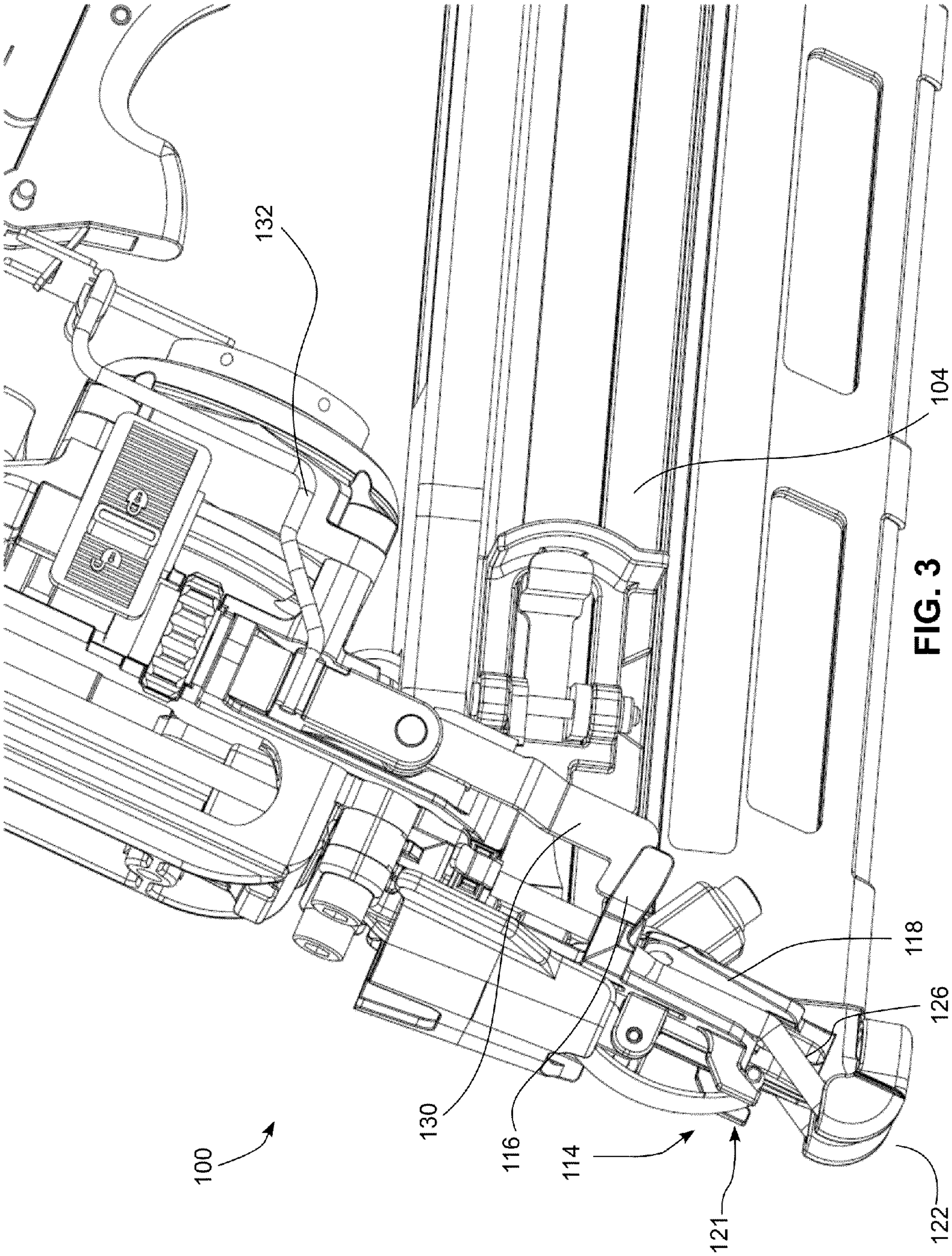
FIG. 3 depicts a cutaway side view of the nose assembly of the fastener driver of FIG. 1 with the work contact element in a depressed/retracted position.
Figure 4:
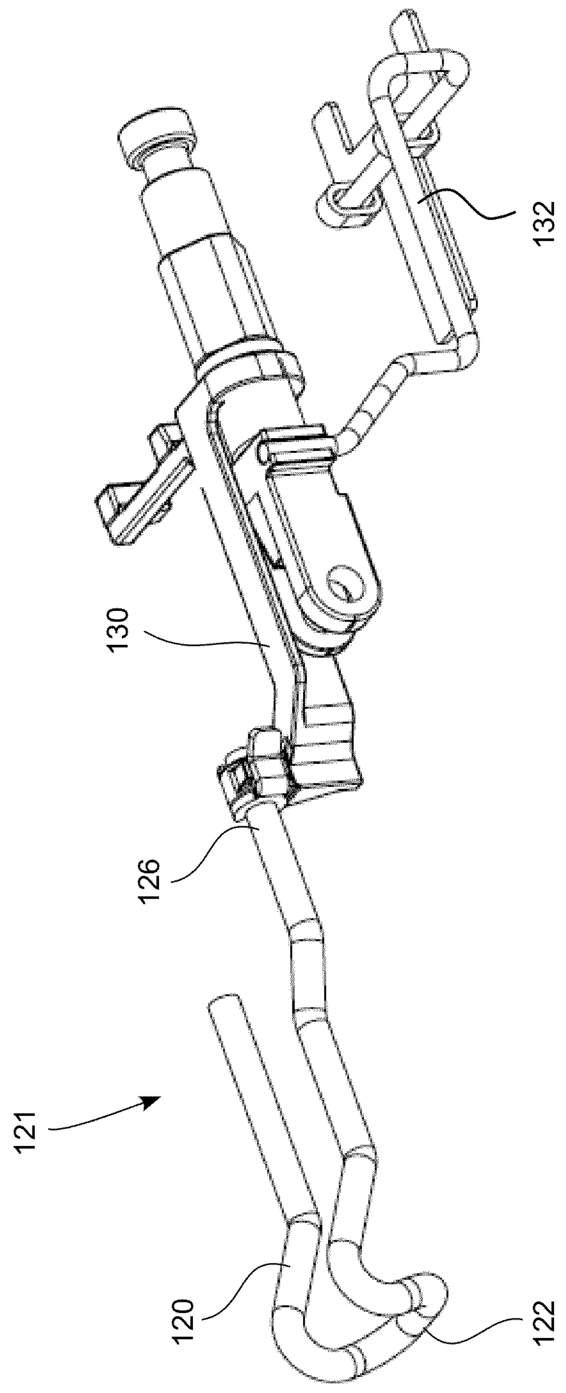
FIG. 4 depicts a perspective view of the work contact element assembly isolated from the other elements of FIG. 2.

The WCE 120 in the embodiment of FIG. 2 and FIG. 3 is shown in isolation in FIG. 4. The WCE 120 is part of a WCE assembly 121 that includes three separate parts that are rigidly connected. In particular, the WCE assembly 121 includes WCE 120, WCE arm 130 and WCE extension arm 132. The WCE 120 is provided as a wireform 126 bent in a shape such that a blunt contact tip 122 is formed at the base of the wireform The blunt contact tip 122 extends out from housing 102 and is designed to make contact with a work piece in operation. The wireform 126 is connected to a WCE arm 130 and the WCE arm 130, in turn, is connected to a WCE extension arm 132 to form the WCE assembly 121. Although FIG. 4 shows one embodiment of a WCE, it will be recognized that the term WCE as used herein is intended to refer to any of various fastener safety devices, regardless of name, intended to contact a work piece and move between an extended position and a retracted position. For example, the term "contract trip" is one example of a term referring to a WCE. The WCE depicted here is only one example of an embodiment of a safety device that only allows the fastener to fire when it is secured against a work piece. It is envisioned that alternative safety mechanisms that ensure the fastener may only fire when placed in contact with a work piece could be used as well.

Figure 5:
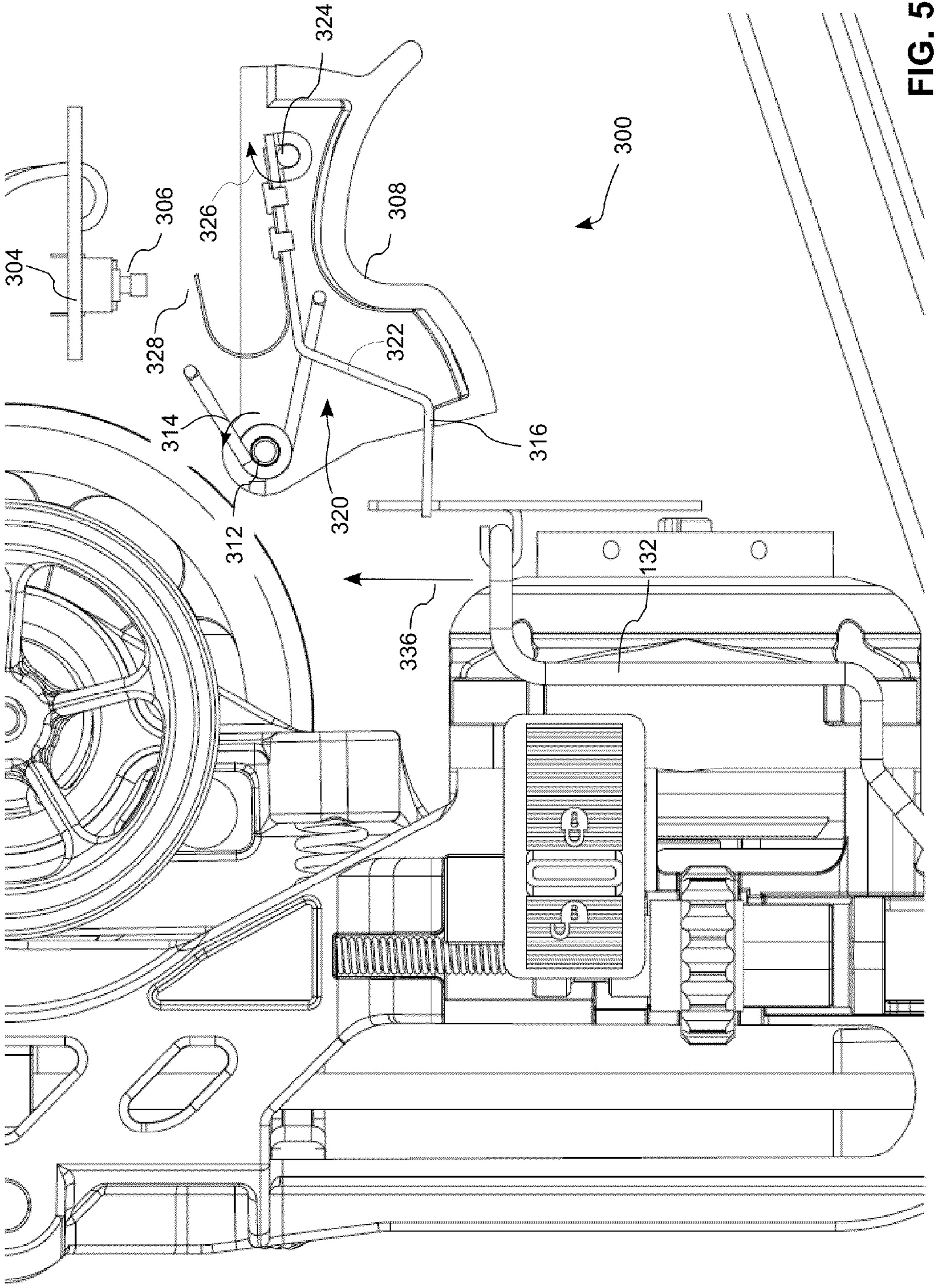
FIG. 5 depicts a trigger arrangement internal to the fastener driver of FIG. 1, when the WCE is extended and the outer trigger is in a relaxed position.

FIG. 5 depicts an outer trigger 308, inner trigger 320, electric switch 304, and WCE extension arm 132 internal to the fastener driver of FIG. 1, when the WCE assembly 121 is extended and the outer trigger is in a relaxed position. An electric switch 304 has a deformable plastic reed 306 that closes the switch in response to pressure from a leaf spring 328, when the leaf spring is pressed against the reed. Electric switch 304 is a mechanical tactile switch that provides a reverse feedback force against pressure applied to close the switch. One common form of a tactile switch is a pushbutton switch. Electric switch 304 is biased open by default, with one embodiment using a spring within the switch (not shown) to bias the plastic reed 306 into an open position. The outer trigger 308 extends from the housing 102 and is pivotally mounted to an outer trigger pivot 312 allowing the outer trigger to pivot in direction 314. The outer trigger pivot 312 may be biased, using a spring, to keep the outer trigger 308 in the relaxed position of FIG. 5 when there is no pulling force applied to the trigger. The outer trigger's position extending from the housing 102 allows for a user's finger to engage the outer trigger. The inner trigger 320 comprises the leaf spring 328, attached to the inner trigger arm 322. The inner trigger arm 322 is pivotally mounted to the inner trigger pivot point 324 allowing the inner trigger arm to pivot along path 326. The inner trigger pivot point 324 is anchored to the outer trigger 308, allowing the entire inner trigger assembly 320 to move along with the outer trigger when the outer trigger is rotated about pivot 312. The outer trigger pivot 312 also biases the inner trigger arm to remain in contact with the outer trigger at lip 316. In FIG. 5, the WCE extension arm 132 is depicted in an extended position, and is slidably moveable in direction 336 if the fastener driver's nose is pressed into a work piece.

Continuing to refer to FIG. 5, the trigger assembly is shown in a first condition where the WCE extension arm 132 is in the extended position, and the outer trigger 308 is in a relaxed position with no pressure applied by the user. This corresponds to an operational state where the fastener's nose is clear of any work piece, and the user is not pulling the outer trigger. The inner trigger arm 322 is disengaged from the WCE extension arm 132. The inner arm leaf spring 328 is removed from contact with the plastic reed 306 of electrical switch 304.

Figure 6:
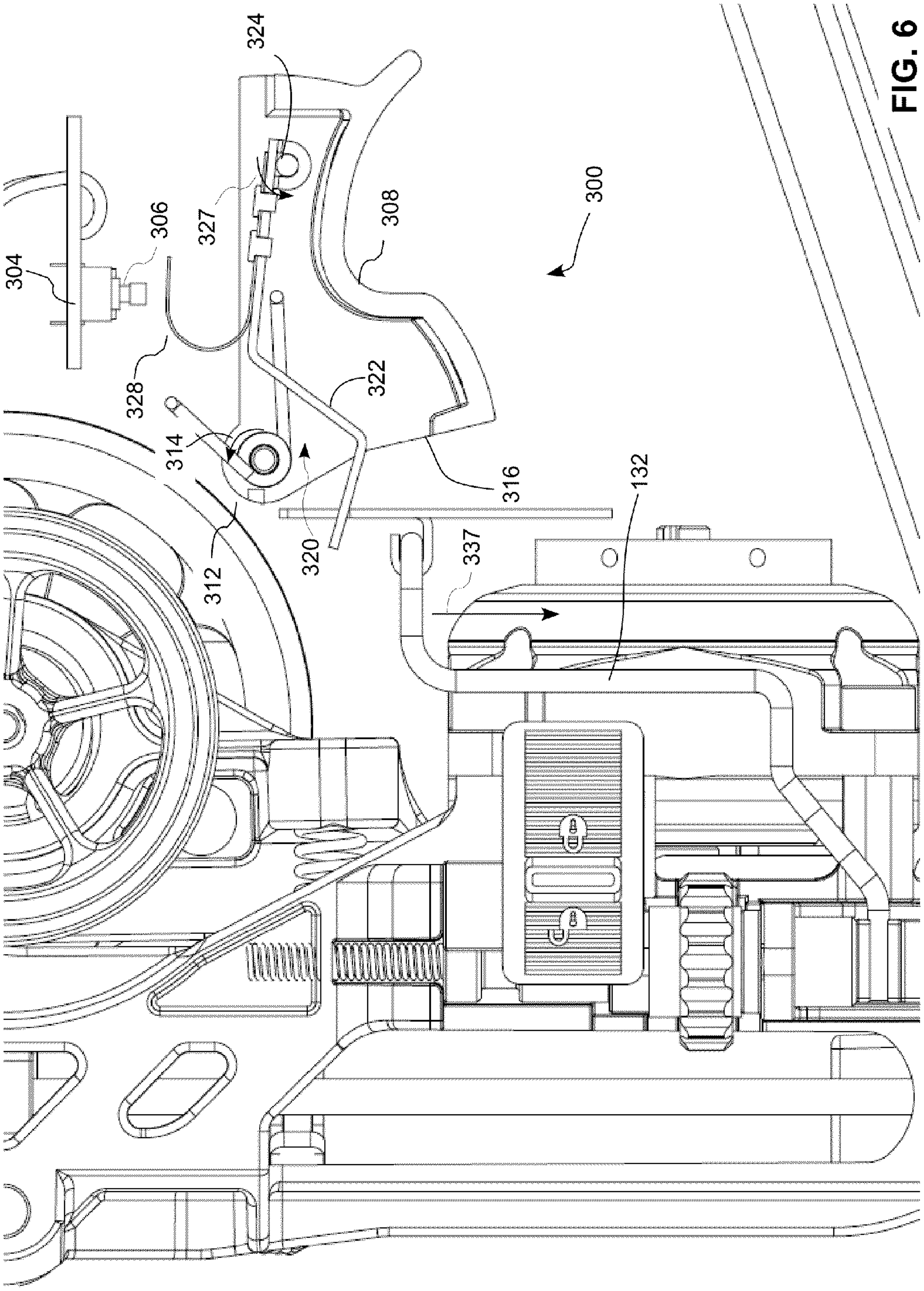
FIG. 6 depicts a trigger arrangement internal to the fastener driver of FIG. 1, when the WCE is depressed and the outer trigger is in a relaxed position.

FIG. 6 depicts the same trigger assembly 300 of FIG. 5 in a second condition where the WCE assembly 121 is depressed and the outer trigger 308 is in a relaxed position. In this condition, the WCE is pressed into a work piece, the WCE extension arm 132 is moved into the position shown in FIG. 6, engaging the inner trigger 320 at the inner trigger arm 322, overcoming the biasing applied by the outer trigger pivot 312, and rotating the inner trigger about its pivot point 324. The inner trigger's leaf spring 328 is now in a second position relative to the plastic reed 306 of electric switch 304, but is still removed from direct contact with the plastic reed. The WCE is fully engaged, and if the fastener's nose is removed from contact with a work piece, the WCE is spring biased to slide in direction 337 returning to the extended position of FIG. 5. In the second condition, the outer trigger pivot 312 is biased to rotate the inner trigger arm 322 and leaf spring 328 along path 327 if the WCE extension arm 132 disengages the inner trigger arm. The outer trigger 308 is in the same position as depicted in FIG. 6.

Figure 7:
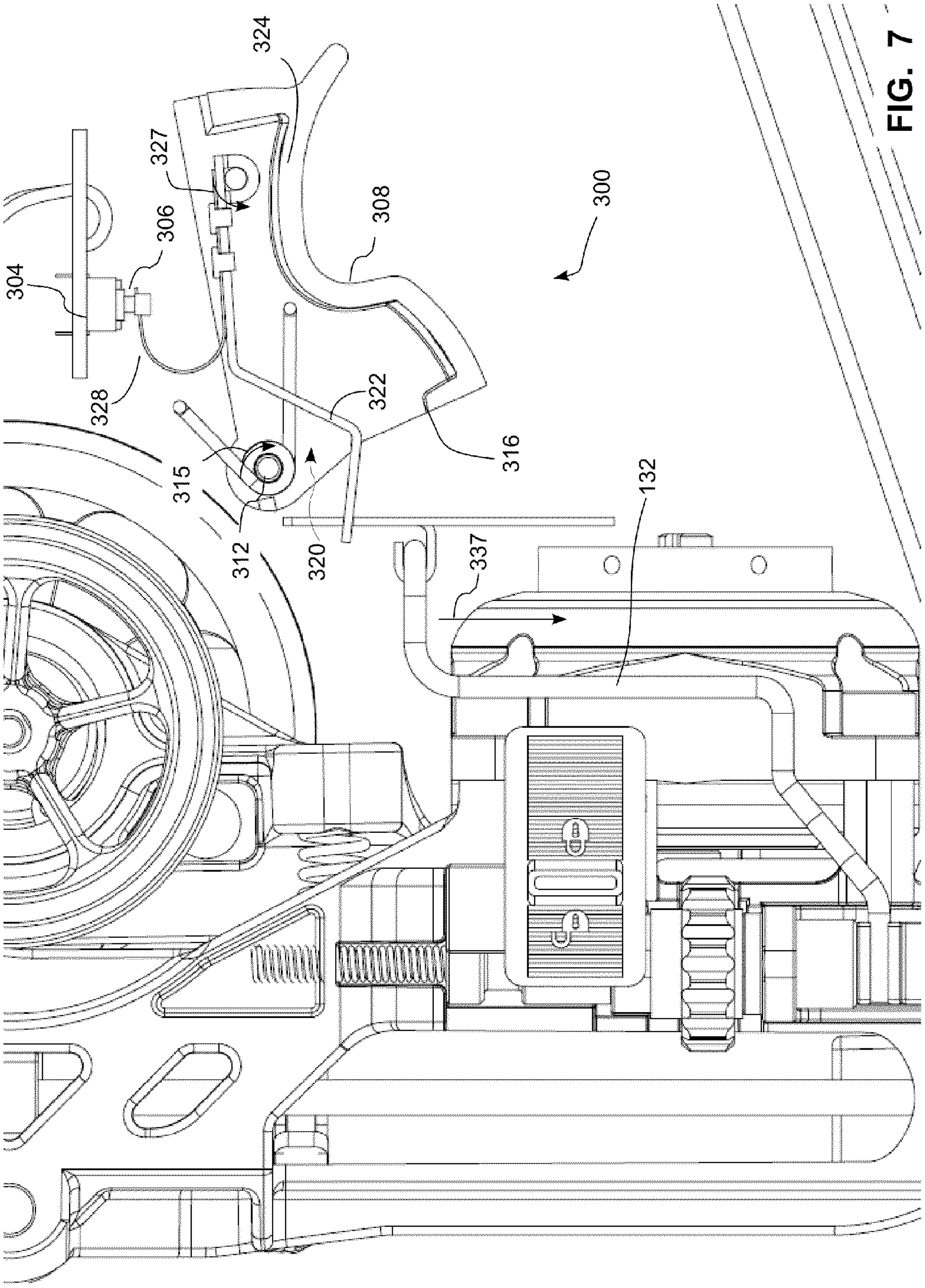
FIG. 7 depicts a trigger arrangement internal to the fastener driver of FIG. 1, when the WCE is depressed and the outer trigger is subsequently placed in a pulled position.

FIG. 7 depicts the same trigger assembly 300 of FIG. 6 in a third condition when the outer trigger 308 is pulled after the WCE extension arm 132 engages the inner trigger arm 322. When the user pulls the outer trigger, the outer trigger pivots about outer trigger pivot point 312 in direction 314 (see FIG. 6), arriving at the position of FIG. 7. The inner trigger assembly 320 is anchored within the outer trigger, and rotates along with the outer trigger. The combination of the inner trigger arm's rotation caused by the WCE extension arm 132 (see FIG. 6) combined with the rotation caused by the outer trigger presses the leaf spring 328 attached to the inner trigger arm into the plastic reed 306 which deforms, closing electrical switch 304.

The third condition of the trigger assembly depicted in FIG. 7 is the firing condition in the present embodiment. In the third condition, the closed electric switch 304 completes an electrical circuit, optionally powering an electronic control unit 964. The electronic control unit controls the flow of electric power to the electric drive motor 202 in response to electric switch 304 being closed. Electric switch 304 may also be referred to as an operating switch, because the electronic control unit and drive mechanism only operate when the switch indicates that the trigger assembly is in the third condition.

After entering the third condition of FIG. 7, the inner trigger 320 must disengage the electric switch before the next fastener is fired. If the user disengages the WCE assembly 121, the inner trigger assembly pivots about inner trigger pivot 324 along path 327. If the user releases the outer trigger 308, the outer trigger pivots about pivot 312 along path 315 returning to a relaxed position. If the user only releases the outer trigger while leaving the WCE assembly 121 engaged, the inner trigger 320 returns to the second condition depicted in FIG. 6. By pulling the outer trigger an additional time, the trigger assembly returns to the third condition of FIG. 7 and the fastener fires. This may occur when a user engages the WCE, pulls the trigger to fire a first fastener, then slides the fastener's nose across a work piece while leaving the WCE engaged, and pulls the trigger a second time.

Figure 8:
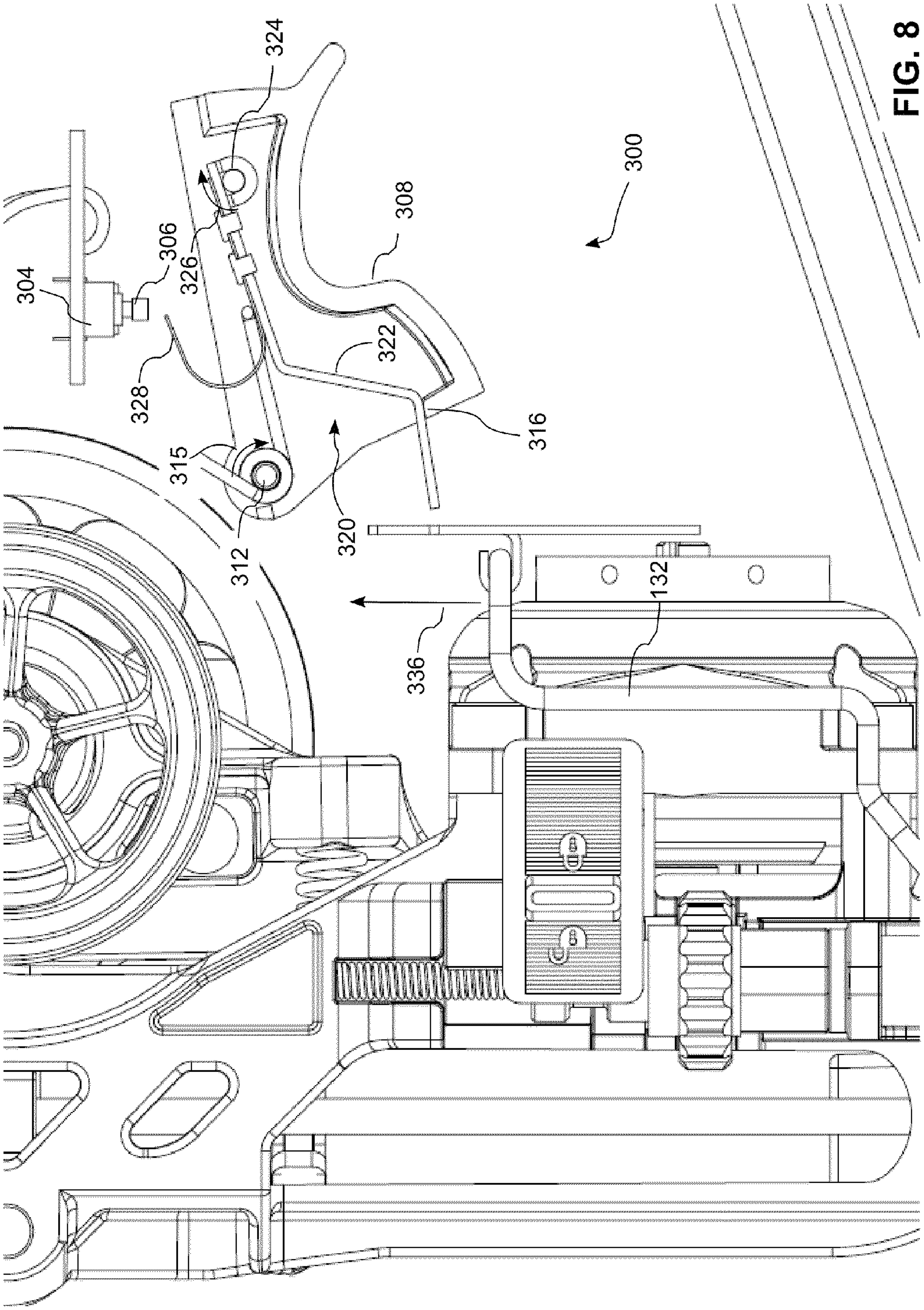
FIG. 8 depicts a trigger arrangement internal to the fastener driver of FIG. 1, when the WCE is extended, and the outer trigger is in a pulled position.

FIG. 8 depicts the same trigger assembly 300 of FIG. 5 in a fourth condition when the WCE is extended, and the outer trigger is in a pulled position, pivoting about outer trigger pivot 312 along path 314. The fourth condition is reached after the, inner trigger assembly 320 rotates along with the outer trigger 308, causing inner trigger arm 322 and leaf spring 328 to move into a position non-aligned with either WCE extension arm 132 or plastic reed 306 connected to electric switch 304. If the outer trigger is released, it pivots about pivot 312 along path 315 returning to the position of the first condition of FIG. 5.

The trigger assembly in the fourth condition of FIG. 8 depicts how the electric switch 304 remains biased open when the WCE 120 is not engaged. If the fastener driver is not engaged with a work piece, then a user who accidentally pulls the outer trigger does not cause the fastener to fire.

Figure 9:
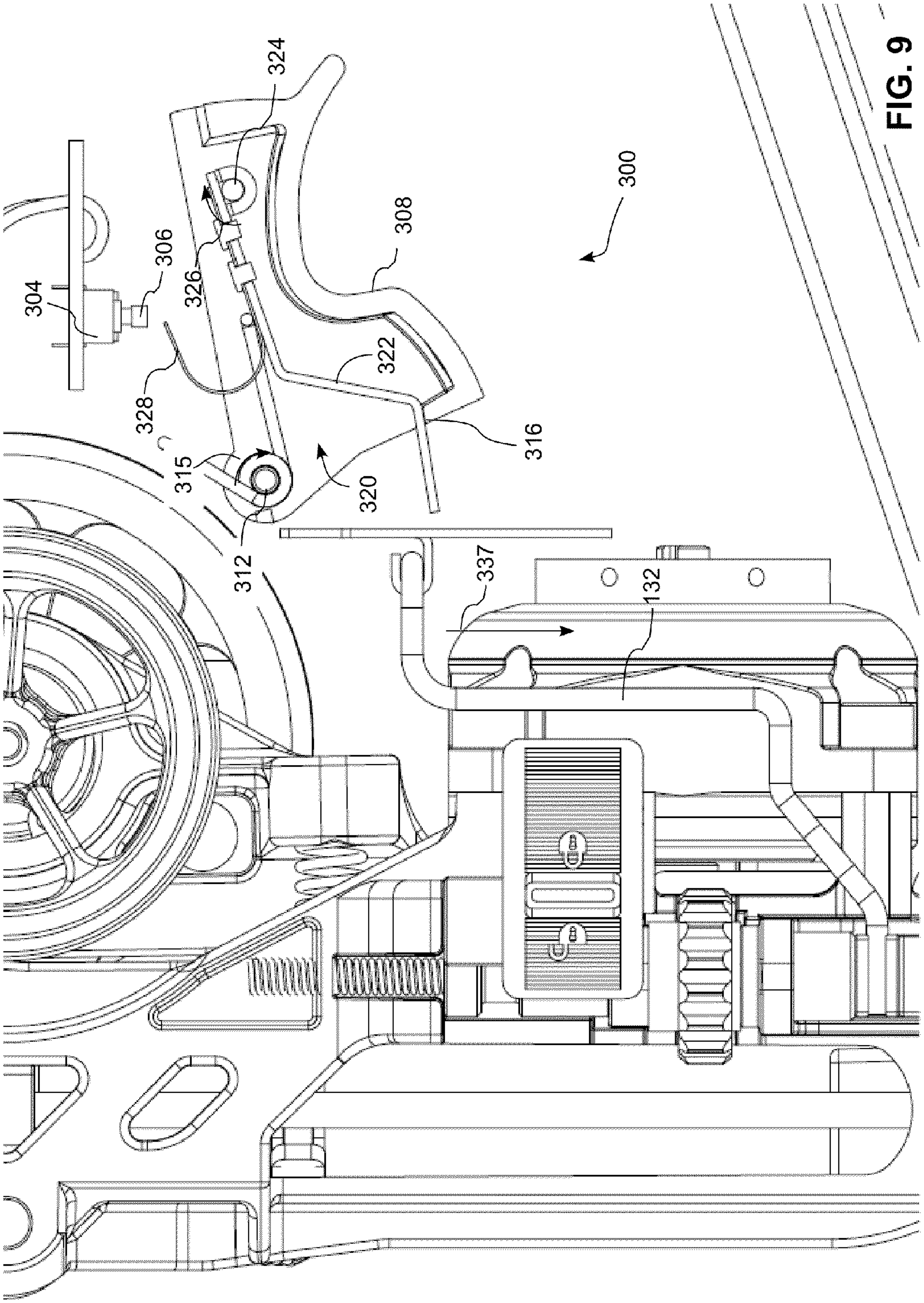
FIG. 9 depicts a trigger arrangement internal to the fastener driver of FIG. 1, when the WCE is depressed while the outer trigger is in the pulled position.

FIG. 9 depicts the same trigger assembly 300 of FIG. 8 also in the fourth condition where the WCE 120 is engaged against a work piece while the outer trigger 308 has been pulled. The WCE extension arm 132 occupies the same depressed position as in second and third conditions described above. However, because the outer trigger 308 has already been pulled, the inner trigger arm 322 has been moved to a remote position where it does not engage the WCE extension arm 132. The inner trigger assembly remains in the fourth condition depicted in FIG. 8 if the WCE is depressed after the outer trigger is pulled.

FIG. 9 depicts another advantage of one embodiment of the current fastener device. In this embodiment, the fastener driver does not fire when the trigger occupies the fourth condition even if the WCE assembly 121 and outer trigger 308 are both engaged simultaneously. Instead, the WCE must be engaged to a work piece first, followed by the outer trigger being pulled in order to fire a fastener. When the trigger assembly is in the fourth condition, the user must disengage the WCE and then release the outer trigger before re-engaging the WCE and pulling the trigger to fire a fastener.

FIG. 5-FIG. 9 depict the operational positions of one possible trigger and switch assembly. The specific components depicted do not exclude the use of different components in alternative embodiments. For example, it is envisioned that the mechanical pushbutton electric switch 304 could be replaced by a non-mechanical switch such as a solid state switch coupled to an electro-optical sensor, where the trigger assembly could close the electric switch by interrupting a light beam in the electro-optical sensor. Any alternative switch mechanism that deactivates the fastener driver when the switch is not engaged could be substituted. Additionally, alternative configurations of the WCE and trigger assembly are envisioned that also prevent the electric switch from closing unless the trigger is closed while the WCE is engaged. Only one of the envisioned alternative embodiments of possible trigger and switch assemblies is described herein.

Figure 10:
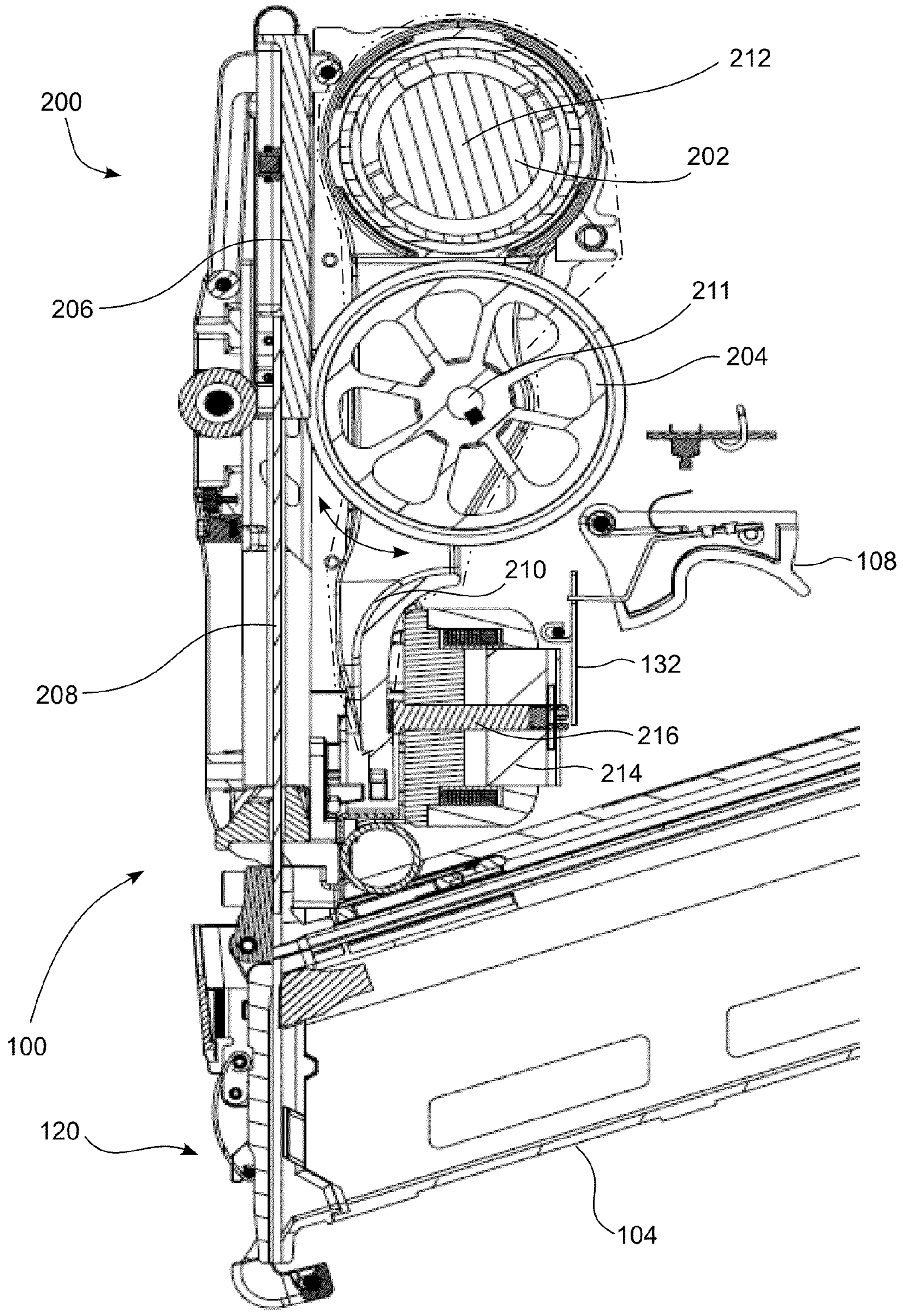
FIG. 10 shows a cutaway side view of a motor and flywheel assembly positioned in the fastener driver and showing the position of the WCE in relation to the trigger assembly.

FIG. 10 shows a side view of the device 100 when the WCE assembly 121 is moved from the extended position of FIG. 2 to the depressed position of FIG. 3. As shown in FIG. 10, the device 100 includes a drive assembly 200 including an electric motor 202, a flywheel 204, a drive block 206, and a drive blade 208. The flywheel 204 is positioned on a pivotable mount 210 (surrounded by dotted lines in FIG. 10) and is configured to rotate about pivot axis 211. The mount 210, in turn, is configured to pivot about a pivot point 212.

Referring to FIG. 7 and FIG. 10 in combination, when a user pulls the outer trigger 308, while the WCE is depressed, the inner trigger's leaf spring 328 engages with the plastic reed 306, closing electrical switch 304 energizing DC motor 202, and an electronic control unit (not shown). The DC motor engages flywheel 204 via a drive belt. Once a predetermined flywheel speed has been reached, the electronic control unit energizes a solenoid 214, causing a plunger 216 to move into contact with the mount 210. The electronic control unit also deprives the DC motor of electrical power once the predetermined flywheel speed has been reached in order to lower the fastener's energy usage. The plunger 216 forces the mount 210 and rotating flywheel 204 to pivot toward the drive block 206. When the rotating flywheel 204 comes into contact with the drive block 206, the drive block 206 and connected drive blade 208 are propelled toward the nose. When the drive block 206 and blade 208 are fired, drive blade 208 impacts the fastener positioned at the end of the magazine 104 and expels the fastener from the device 100. A similar arrangement is disclosed in U.S. patent application Ser. No. 12/191,960, the contents of which are incorporated herein in their entirety. Furthermore, although the drive assembly of FIG. 10 includes a DC motor and flywheel, it will be recognized that any of various other drive assemblies are possible.

Figure 11:
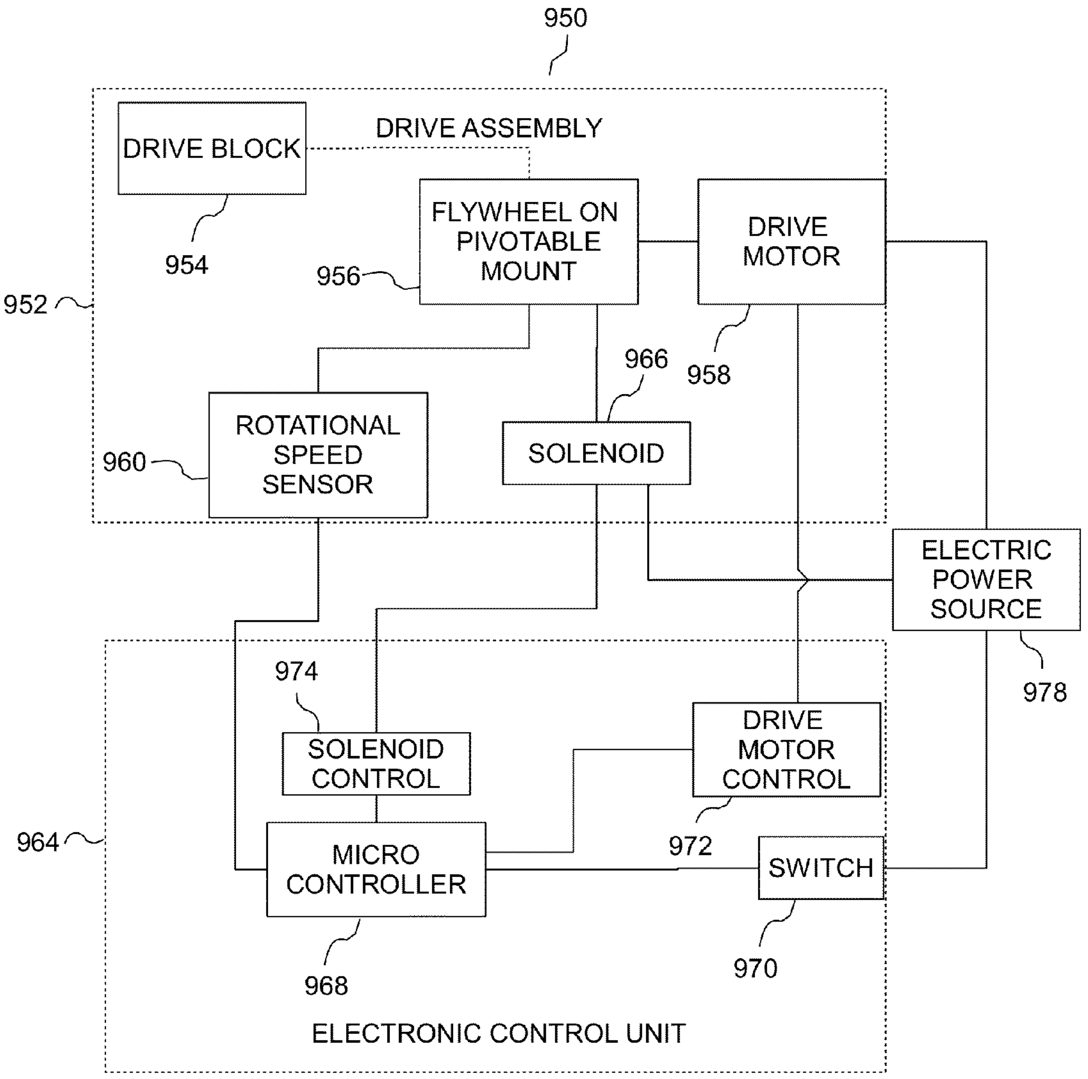
FIG. 11 is a block diagram of an electronic control system and driving mechanism using a single switch to control a fastener driver.

FIG. 11 is a block diagram of an electronic control unit 964 and drive assembly 952 for a fastener device. In one possible embodiment, when the switch 970 is closed, an electrical circuit from the electric power source 978 to the microcontroller 968 and drive motor control circuit 972 is closed. In alternative embodiments, the electric power source and microcontroller are always connected, and the switch closes to signal the microcontroller that the microcontroller should initiate a firing sequence. In either embodiment, switch 970 indicates to the electronic control unit 964 that the WCE is depressed and the trigger has been pulled. The microcontroller 968 is generally an integrated circuit, and may be one of a microprocessor, field programmable gate array, or application specific integrated circuit. The drive motor control 972 is generally a circuit that may be opened or closed via signals generated in the microcontroller. One example would be a power MOSFET circuit with a gate that is coupled to the microcontroller, allowing the microcontroller to close the power MOSFET circuit applying electric power to the drive motor 958 or to open the power MOSFET circuit, removing electric power from the drive motor. The solenoid control 974 is generally a circuit that may be opened or closed via signals generated in the microcontroller. The solenoid control may have a similar design to the drive motor control, including a power MOSFET circuit coupled to the microcontroller 968. The microcontroller may then control whether or not the solenoid receives electrical power by opening or closing the solenoid control 974.

The drive assembly 952 includes an electric drive motor 958 that is electrically connected to the electric power source 978, and the drive motor control circuit 972. The motor is physically coupled to the flywheel 956 via a drive belt. The flywheel is mounted on a pivotable mounting arm. The solenoid 966 is electrically connected to the electric power source 978 as well as the solenoid control circuit 974.

The electronic control unit 964 is further coupled to a rotational speed sensor 960. The rotational speed sensor is adapted to generate a signal representing the rate of rotation of a flywheel 956, and the microcontroller 968 is adapted to interpret this signal and compare it with one or more threshold values. One example of a rotational speed sensor is a Hall Effect sensor. Using a Hall Effect sensor, a ring magnet is mounted on the flywheel 956, and as the flywheel turns, the Hall Effect sensor is positioned such that the magnet's rotation causes the Hall Effect sensor to produce a pulse train in response to the magnets rotational speed. The frequency of the pulses increases as the rate of the flywheel's rotation increases, and the microcontroller is configured to detect the frequency. Using a known frequency level as a threshold, when the detected frequency meets this threshold, the microcontroller 968 of the present embodiment takes two actions. First, the microcontroller opens the drive motor control circuit 972, depriving the drive motor 958 of electrical power. Second, the microcontroller closes the solenoid control circuit 974, which fires the solenoid 966. It is envisioned that the microcontroller in different embodiments could take different actions in response to input from speed sensors. For example, some embodiments may allow the electric motor to remain in motion as the solenoid is fired.

The solenoid 966 is positioned so that it forces a plunger 216 (FIG. 10) into the pivotable mount holding the flywheel 956 when it fires. The flywheel pivots into contact with a drive block 954 and propels the drive block and attached drive blade 208 towards the nose 114. The fastener is positioned in the drive blade's path, and the force drives the fastener into the work piece. After the solenoid 966 has fired, the microcontroller 968 is configured to open the solenoid control circuit 974, and to open the drive motor control circuit 972 for the remainder of the time that the switch 970 remains closed. This configuration allows the fastener to fire exactly once for each time the switch is closed.

Figure 12:
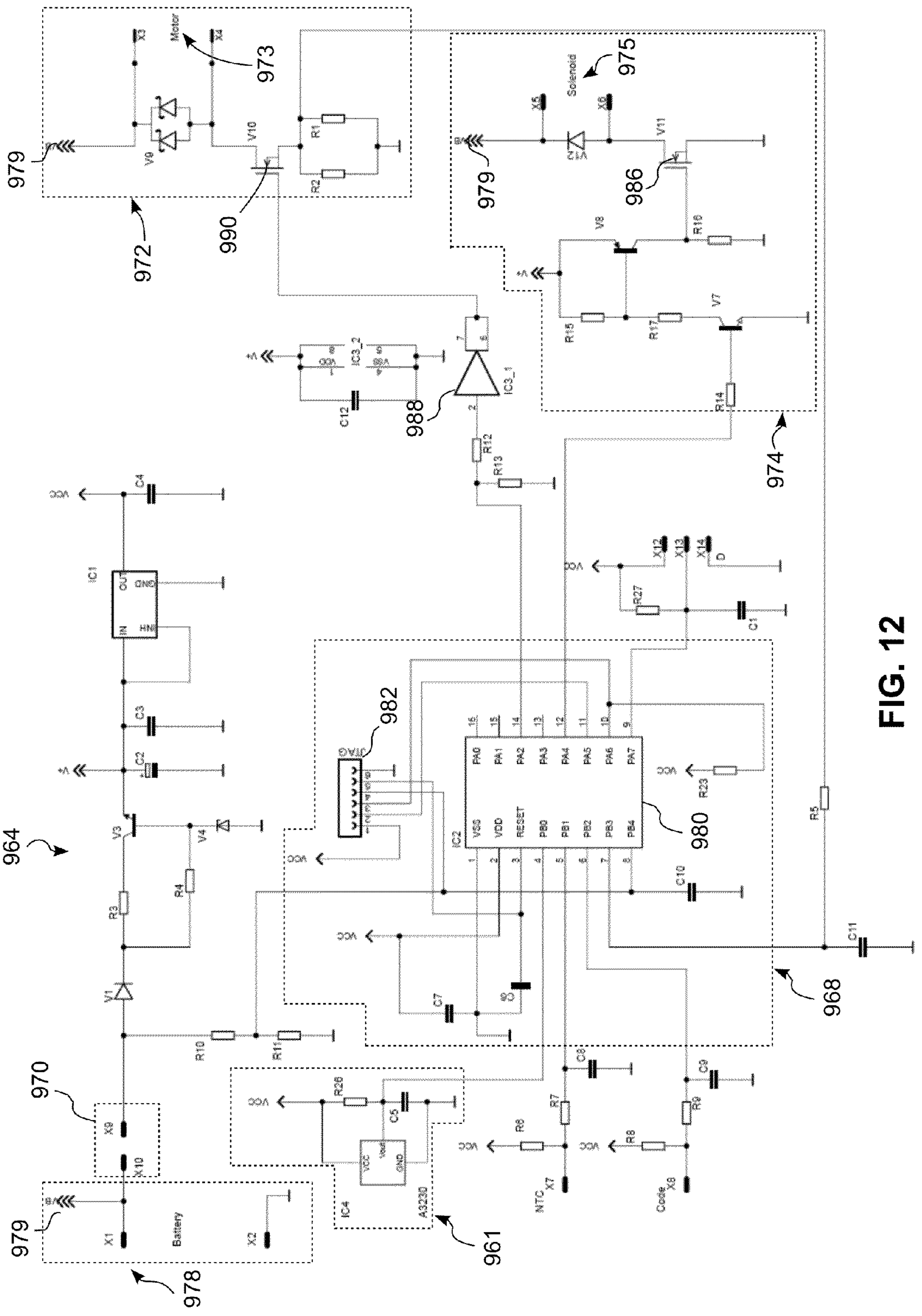
FIG. 12 is a schematic diagram depicting an exemplary embodiment of the electronic control system of FIG. 11.

FIG. 12 is a schematic diagram showing an exemplary electrical circuit that may be used to implement the electronic control unit 964, and to control the drive assembly 952 of FIG. 11. The electric power source 978 is depicted here as a battery, which is a common power source for cordless fasteners. Alternatives could include standard electric wall sockets, fuel cells, ultracapacitors, or any other device that can hold sufficient electrical energy to operate the fastener. In FIG. 12, the electrical switch 970 is positioned to be in series with the circuit connecting electric power source 978 with the microcontroller 968. This arrangement has several advantages. For example, the microcontroller 968 and the rest of the electronic control unit 964 will only use electrical power when the switch 970 is closed. However, alternative embodiments where the electrical switch does not complete the circuit powering the electronic control unit, but instead merely acts as an input to the microcontroller 968 are also possible. Additionally, a second circuit 979 (also indicated as VB in the schematic) allows the battery to couple with other components in the fastener when the electric switch is not closed.

Continuing to refer to FIG. 12, the microcontroller unit 968 of the depicted embodiment is comprised of an integrated circuit 980 and an optional Joint Test Action Group (JTAG) connector 982 that is used for programming the controller from an external source. There are many possible alternative embodiments to the microcontroller shown at 980. These include digital microprocessors, field programmable gate arrays (FPGAs), application specific integrated circuits (ASICs), or any logic circuit capable of processing input from the rotational speed sensor interface 961, and controlling the drive motor control 972 and solenoid control 974. The rotation speed sensor interface 961 includes circuitry that adapts the pulse train generated by the rotational speed sensor 960 (FIG. 11) so that the microcontroller 968 may interpret that signal to determine how fast the drive flywheel is rotating. The microcontroller 968 initially activates the electric drive motor via drive motor control 972, using a MOSFET driver 988. When the flywheel 956 speed reaches a predetermined threshold, the microcontroller fires the solenoid via solenoid control 974.

Referring to the drive motor control 972, the VB circuit 979 is directly connected to the motor terminal 973. However, no electric power will be delivered unless a power MOSFET 990 is in a closed state. When the microcontroller 968 of the present embodiment is disconnected from the electric power source 978, power MOSFET 990 is in an open state and no electric power flows to the drive motor 958. Similarly, the solenoid control 974 has a terminal 975 connected to the solenoid 966 and VB 979, but no electric power flows unless power MOSFET 986 is in a closed state. When the microcontroller 968 of the present embodiment is disconnected from the electric power source 978, power MOSFET 986 is in an open state and no electric power flows to the solenoid 966.

In one mode of operation, a user places the fastener's nose in contact with a work piece, and presses down, depressing the WCE which engages the inner trigger. Next, the user pulls the external trigger, which pushes the inner trigger's contact into the switch, closing the switch. The switch closes the electric power circuit, powering the electronic control unit which then activates the electric motor, rotating the flywheel until the detected flywheel velocity has passed a predetermined threshold. The electronic control unit then removes power from the electric motor, and fires a solenoid actuator that drives a piston into the drive assembly, causing the assembly to pivot the spinning flywheel into the drive block. The drive block is forced towards the nose, propelling a drive blade into a fastener, which is driven into the work piece. If the user does not operate the fastener in the above manner, the inner trigger will not close the switch and the fastener will not fire.

In another mode of operation, a user places the fastener's nose in contact with a work piece, and presses down, depressing the WCE which engages the inner trigger. Next, the user pulls the external trigger, which pushes the inner trigger's contact into the switch, closing the switch. The fastener fires in the manner described above, and then the user releases the external trigger. Next, the user slides the fastener's nose across the work piece with the WCE remaining depressed as the fastener slides. The user then pulls the external trigger a second time, and the fastener fires again. The user may fire the fastener additional times by pulling and releasing the trigger while the WCE remains depressed while in contact with a work piece. The electronic control unit is configured to operate the drive mechanism one time for each pull of the trigger in this operational mode.

In a safe mode of operation, the fastener does not fire when the WCE and trigger are manipulated in a different manner than described above. If the WCE is in its extended position, then the inner trigger arm does not engage the switch if the external trigger is pulled, and the fastener does not fire. Additionally, if the user pulls the trigger and then depresses the WCE while the trigger is pulled, the WCE extension arm does not engage the inner trigger arm. The inner trigger remains out of engagement with the switch, and the fastener will not fire. If the user pulls the trigger without the WCE being depressed, the trigger must first be released, and then the WCE must be engaged before a subsequent trigger pull causes the fastener to fire.

The embodiments disclosed herein have several advantages over the prior art. For example, the electric switch 304 is the only switch needed to operate the fastener driver safely, while prior art fasteners have required multiple switches or sensors to operate safely. As another example, the disclosed fastener is more efficient than prior art embodiments because it removes electric power from the drive motor after the motor has accelerated the flywheel to an operational speed, and because one embodiment allows the electronic control unit to be disconnected from electrical power when the electric switch is open.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A fastening tool comprising:

a housing including a nose portion;

a drive assembly supported by the housing and configured to drive a fastener from the fastening tool;

a work contact element extending from the nose portion of the housing that is moveable between an extended position and a depressed position;

a trigger moveable between a release position and a fire position;

an electric power source;

an electronic control unit electrically connected to the drive assembly and configured to selectively deliver electric power to the drive assembly when the electronic control unit is receiving electric power from the electric power source and to deprive the drive assembly of electric power when the electronic control unit is not receiving electric power from the electric power source;

a circuit that electrically connects the electric power source to the electronic control unit;

a single electric switch electrically connected to the circuit that is movable between an open position and a closed position;

wherein, when the electric switch is in the open position, the circuit is opened and power is not provided to the electronic control unit from the electric power source, and when the electric switch is in the closed position, the circuit is closed and power is provided to the electronic control unit from the electric power source;

an inner trigger assembly that moves the electric switch from the open position to the closed position in response to the trigger being moved from the release position to the fire position while the work contact element is in the depressed position wherein the drive assembly includes a solenoid, a flywheel, and an electric motor configured to rotate the flywheel, the flywheel configured to move between a first flywheel position and a second flywheel position, and the solenoid configured to move the flywheel between the first flywheel position and the second flywheel position; and wherein the electronic control unit is electrically connected to the electric motor and the solenoid and configured to selectively deliver power to the electric motor and the solenoid while receiving electric power from the electric power source and to deprive the electric motor and solenoid of electric power when the electronic control unit is not receiving electric power from the electric power source.

2. The fastening tool of claim 1 wherein the electronic control unit comprises a microcontroller electrically connected to an electric motor control that controls the flow of power to the electric motor and a solenoid control that controls the flow of power to the solenoid.

3. The fastening tool of claim 2 wherein the electronic control unit further comprises a flywheel sensor configured to determine the rotational speed of the flywheel, and wherein the electronic control unit is configured to cause the solenoid control to deliver electric power to the solenoid when the flywheel sensor determines that the flywheel has reached a predetermined speed.

4. The fastening tool of claim 3 wherein the electronic control unit is configured to cause the electric motor control to deprive the electric motor of power when the flywheel has reached the predetermined speed.

5. The fastening tool of claim 1 wherein the single electric switch is a tactile switch.

6. The fastening tool of claim 1 wherein the single electric switch is configured to connect the electric power source to the electronic control unit only if the work contact element is moved from the extended position to the depressed position before the trigger is moved from the release position to the fire position.

7. The fastening tool of claim 1 wherein the drive assembly includes a solenoid and an electric motor, wherein the electronic control unit comprises a microprocessor, and wherein electric power is not provided to the solenoid, the electric motor, or the microprocessor unless the electric switch is closed.

8. The fastening tool of claim 1, wherein the electric switch is biased toward the open position.

9. The fastening tool of claim 8, wherein the inner trigger assembly includes a leaf spring that is moved into engagement with the electric switch to move the electric switch from the open position to the closed position.

10. The fastening tool of claim 9, wherein the leaf spring is attached to an inner trigger arm, the inner trigger arm being pivotably attached to the trigger for pivotal movement between a first position and a second position in relation to the trigger, wherein the leaf spring is maintained spaced apart from the electric switch when the inner trigger arm is at the first position in relation to the trigger and the trigger is moved between the release and the fire position, wherein the leaf spring is moved into engagement with the electric switch when the inner trigger arm is at the second position in relation to the trigger and the trigger is moved from the release to the fire position, and wherein the work contact element is configured to move the inner trigger arm from the first position to the second position as the work contact element moves from the extended position to the depressed position.

11. The fastening tool of claim 10, wherein the work contact element includes an extension arm that is moved into and out of engagement with the inner trigger arm as the work contact element moves between the depressed and the extended positions.

12. The fastening tool of claim 11, wherein the inner trigger arm is positioned in a path of movement of the extension arm when the work contact element is in the extended position and the trigger is in the release position, and wherein the inner trigger arm is moved out of the path of movement of the extension arm when the work contact element is in the extended position and the trigger is moved away from the release position.

* * * * *